United States Patent [19]

Trema

[11] Patent Number: 4,884,663

[45] Date of Patent: Dec. 5, 1989

[54] DEVICE FOR SUPPORTING AND ATTACHING A DISK BRAKE CALIPER

[75] Inventor: Daniel Trema, Bezons, France

[73] Assignee: Elf France, Courbevoie, France

[21] Appl. No.: 228,539

[22] Filed: Aug. 4, 1988

[30] Foreign Application Priority Data

Aug. 21, 1987 [FR] France ................................ 87 11799

[51] Int. Cl.$^4$ .......................... F16D 55/36; B62L 1/00
[52] U.S. Cl. ................................ 188/18 A; 188/73.31; 188/205 R; 188/344; 280/276
[58] Field of Search .................... 188/18 A, 344, 18 R, 188/205, 206, 26, 72.5, 72.4, 73.31, 24.11, 73.46, 71.5, 71.1; 180/219; 280/275, 276, 666

[56] References Cited

U.S. PATENT DOCUMENTS

| | | | |
|---|---|---|---|
| 2,953,395 | 9/1960 | Turner | 280/276 |
| 3,194,350 | 7/1965 | Soltis | 188/264 AA X |
| 3,584,708 | 6/1971 | Heck | 188/264 E X |
| 4,093,043 | 6/1978 | Smith | 188/73.46 |
| 4,526,249 | 7/1985 | Parker | 280/275 X |
| 4,553,622 | 11/1985 | De Cortanze | 188/18 A X |
| 4,596,312 | 6/1986 | Kawaguchi | 188/18 A |
| 4,660,683 | 4/1987 | Hayashi et al. | 188/181 R X |
| 4,732,241 | 3/1988 | Yoshida | 188/344 X |
| 4,756,567 | 7/1988 | Trema | 280/276 X |
| 4,785,905 | 11/1988 | Trema | 180/219 |

Primary Examiner—Douglas C. Butler
Attorney, Agent, or Firm—Burgess, Ryan & Wayne

[57] ABSTRACT

The supporting and attaching device is connected to non-rotating parts of at least one brake caliper or yoke intended to cooperate with a brake disk and it comprises an attaching piece in a generally arcuate form, situated beyond the periphery of the disk and of which at least part of the transversal section is U-shaped with two legs one of which legs constitutes the section of a plate clamped onto a single arm for wheel suspension, while the other leg constitutes the section of at least one tab secured on either side to a brake caliper straddling a brake disk and is applied to double disk brakes for motorcycles.

8 Claims, 2 Drawing Sheets

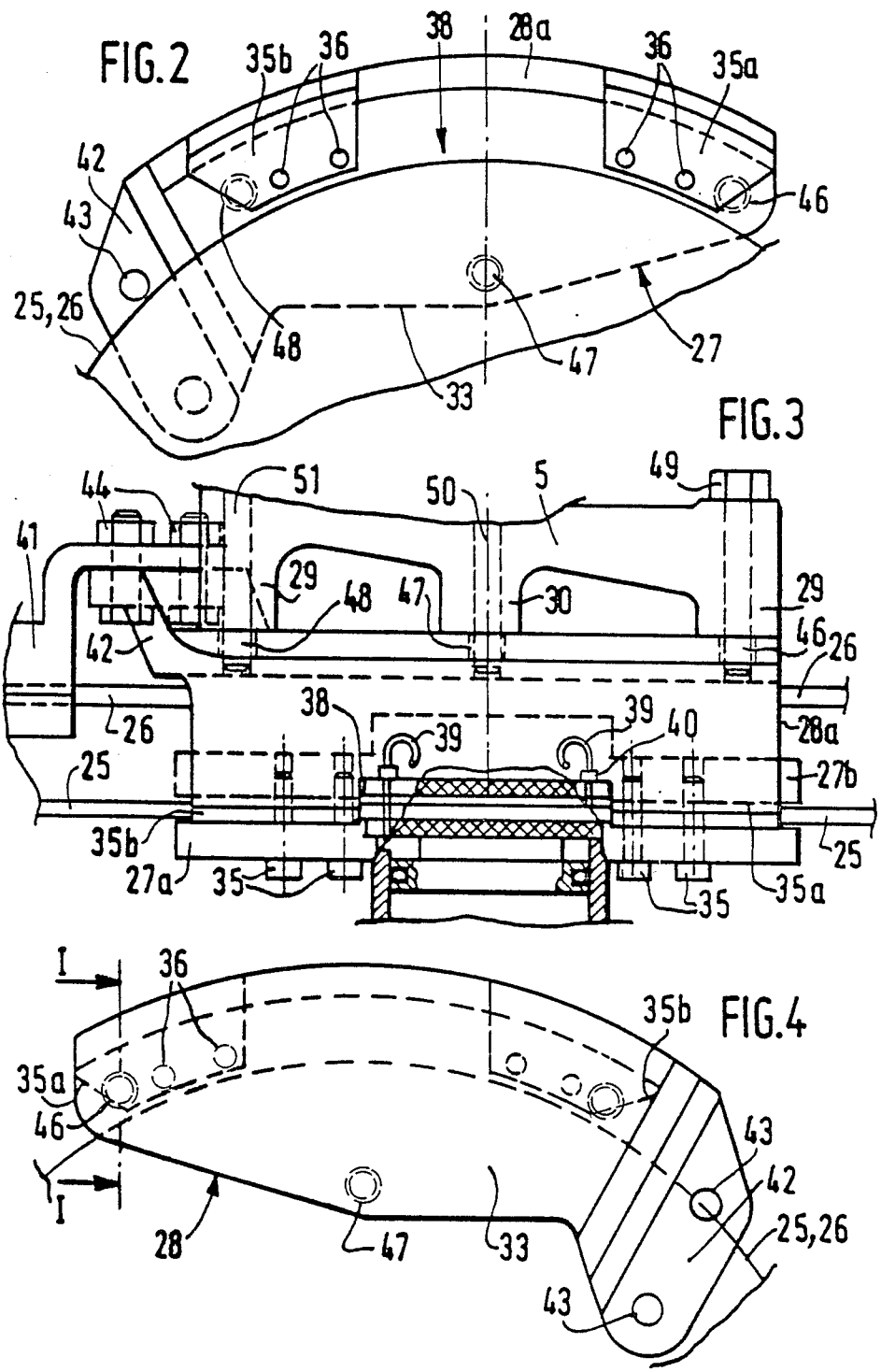

DEVICE FOR SUPPORTING AND ATTACHING A DISK BRAKE CALIPER

The present invention concerns a device for supporting and attaching to non rotating parts at least one brake disk caliper or yoke intended to cooperate with a disk brake.

The application of disk brakes currently encounters various difficulties in positioning of said brake parts; on the one hand, the disks inside the space left free around the wheel hub, which limits the external and internal diameters of the disk and, on the other hand, the clamping calipers of these surfaces on the friction linings, since the non rotating support parts of the wheel adapted to constitute a reaction member to the braking torque are often situated at a distance from the space left free for the disk. These difficulties are further aggravated by the necessity of mounting two braking disks per wheel on rapid or heavy vehicle when the thermal performances of a single disk are insufficient. The problem is further complicated in the case of motorcycles due to the fact that the front wheel supports the greatest part of braking and that it is important, for the stability of the vehicle during braking, that the braking torque be applied as close as possible to the medium plane of the wheel.

One solution has been proposed which uses a caliper support piece rotatively mounted around the wheel axle and retained tangentially in rotation by a reaction connection rod. Such a solution proves to be both expensive and difficult to perform when it is necessary to dispose of two brake disks on a single wheel. The technical difficulties are again increased when it is necessary to equip a wheel carried by a single wheel suspension arm, since the wheel surrounds this single arm, thereby reducing the diameter of the brake disk(s), while the considerable gap between the single suspension arm and the disks is poorly adapted to connect the brake calipers to the single arm.

One of the aims of the present invention is specifically to overcome these drawbacks and to allow to produce very compact wheel brakes having two disks and in which the calipers are connected in a non-bulky manner to the single wheel suspension arm.

With this aim, according to the invention the device for supporting and connecting to the non rotating parts of at least one brake caliper comprises an attaching piece having a generally circuate form, situated beyond the periphery of the disk and of which at least part of the transversal section is U-shaped with two legs, one of which legs constitutes the section of a plate secured onto a member reacting to the braking torque, such as a single wheel suspension arm, while the other leg constitutes the section of at least one tab secured on either side to a brake caliper straddling a brake disk, the median plane of which coincides substantially with that of the said tab. The two single arms of the U-shape generally have unequal lengths, the longer arm being that corresponding to the transversal cross-section of the plate.

According to another embodiment of the support device according to the invention, it comprises two tabs situated adjacent to the ends of the attaching piece and separated by a central gap allowing the introduction of the brake linings. The brake caliper is generally constituted by two parts assembled on the tab(s) and, where necessary, on themselves by surrounding the brake disk placed in the extension of the tab(s). The brake caliper is assembled on the tab(s) by means of screws passing through the assembly holes provided in these tabs.

According to another embodiment of the brake caliper in relation with the support device, the brake caliper comprises a first caliper part straddling a first brake disk situated substantially in the extension of the tab(s) and a second caliper part straddling a second brake disk the active part of which is disposed facing the plate in a mean plane located between that of the plate and that of the tabs.

According to another embodiment of the support device according to the invention, the attaching piece comprises a lateral extension the mean plane of which is displaced with respect to that of the securing plate, on the side opposite that of the tabs and which is provided with holes for securing another brake caliper cooperating with another brake disk disposed in the vicinity of the plate in a mean plane located between that of the plate and that of the tabs.

The connecting piece having a general arcuate form can be made of a single piece integral with the member reacting to the braking torque, such as a single wheel suspension arm, in which the plate is integrated.

According to a further embodiment of the invention, the securing plate on the member reacting to the braking torque has the form of a flattened sector, with a generally triangular form, provided with fixation holes adjacent to each of the ends of the triangle and a greater thickness than that of the tab(s).

The wheel brake having two disks, in particular for a front wheel of a motorcycle, using a device for supporting and attaching a caliper or yoke according to the invention, comprises two brake disks engaged by internal grooves on the external grooves of a cylindrical drum connected at least in rotation to the wheel to be braked, these disks floating axially and being maintained in axial position onto the grooves of the drum by the abutment of the brake linings of the calipers. The grooves of the drum are disposed on the path of the projection of the attaching piece on the axis of rotation of the wheel.

Other aims, advantages and objects of the invention will become apparent from the following description of an embodiment of the invention, given by way of non-limitative illustration with reference to the appended drawing in which:

FIG. 2 is a side view of the connecting piece in an arcuate form allowing to mount the device according to the invention, the cooperating brake disks being shown with torn-away parts;

FIG. 3 is a view from above with partial torn-away parts, corresponding to the side view of FIG. 2 and representing the connecting piece mounted on a member reacting to the braking torque and provided with brake calipers straddling the brake disks;

FIG. 4 is a side view opposite that of FIG. 2 of the connecting piece in an arcuate form.

Figure 1:
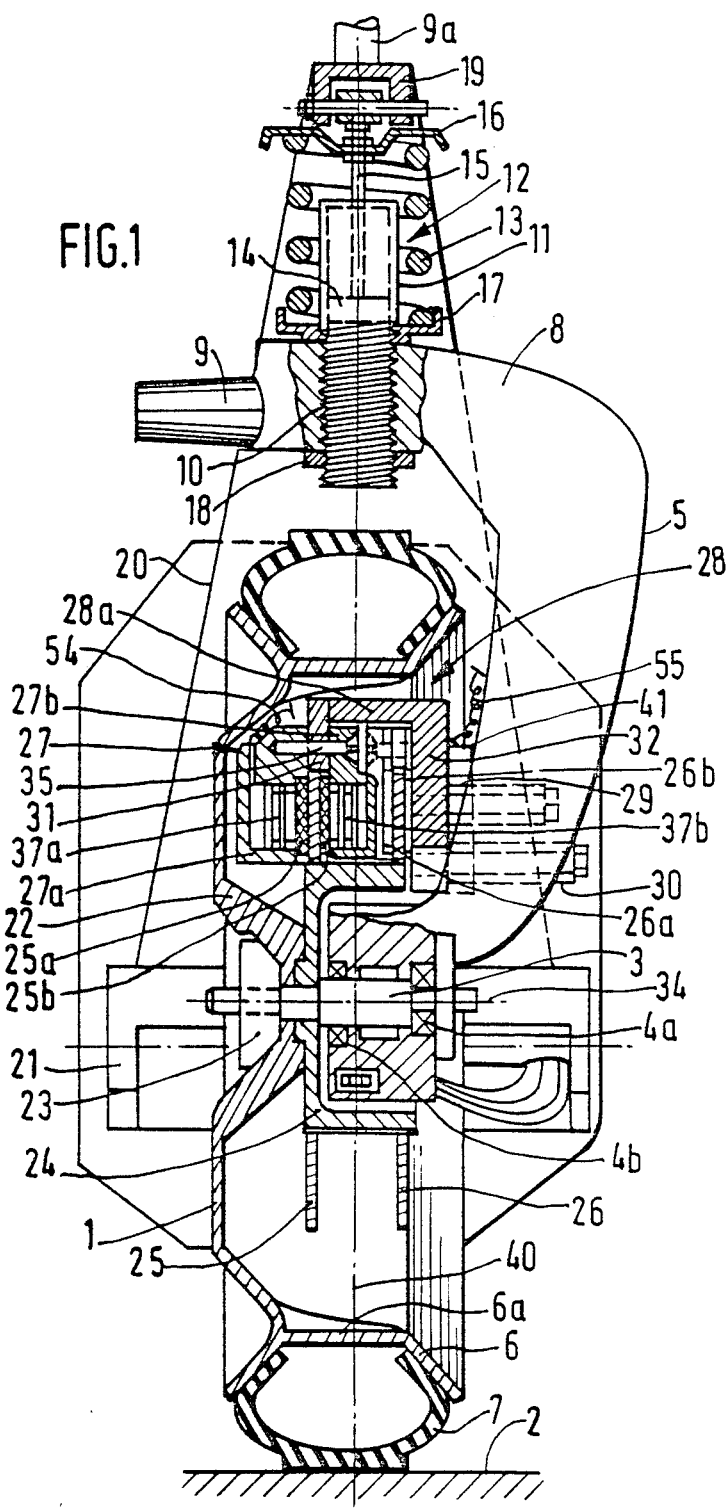
FIG. 1 represents in front elevation and in cross-section along the axle of the wheel hub (plane I—I of FIG. 4), a motorcycle front assembly using the support and attaching device for the disk brake caliper according to the invention, as well as the brake with disks mounted with said support.

FIG. 1 shows a frontal view of a front assembly of a motorcycle, constituted by a front wheel 1 which runs on a runway 2, rotating with its axle 3 mounted on ball bearings 4a and 4b carried by a single suspension arm or strut 5. The single arm 5 presents a part bent in the form of a C enveloping the section of the wheel 1 constituted by a wheel-rim 6 having bottom 6a and a tire 7. The upper part 8 of the single arm 5 presents a lug 9 connected to a steering bar 9a and a threaded bore 10 receiving the body 11 of a combined spring shock-absorber 12 comprising an external spring 13 and an internal shock-absorber piston 14, movable in a bore of the body and of which the rod 15 is connected to an upper support plate 16 of the spring 13. The lower support of the spring 13 is constituted by a cup 17 screwed onto the body 11 in order to maintain it in position on the upper part of the single arm, cooperating with a lower screwed retaining ring 18. The upper support plate 16 is connected by any appropriate means to the front nose 19 of the chassis 20 of the motorcycle supporting the motor-transmission block 21 and also the weight of the motorcycle driver.

The hub 22 of the wheel 1 is pressed by a screw 23 on the axle 3 and is rendered integral in rotation with a drum 24 for supporting the brake disk. The drum 24 is provided o its periphery with grooves on which axially slide the corresponding grooves of two brake disks 25 and 26 which are, in fact, axially maintained in position through contact with the respective brake linings 25a and 25b, and 26a and 26b with which their friction paths cooperate.

The brake linings of the disk 25 are borne by a brake disk caliper or yoke 27 secured to an intermediary or connecting piece 28, itself fixed onto bosses 29, 30 of the arm 5. The connecting piece 28 laterally presents a generally arcuate form (cf. FIGS. 2 and 4) and in transverse cross-section, such as represented in FIG. 1, the U-shaped form with two legs 31 and 32 having different lengths and thicknesses and connected by a thick bar 28a. The leg 32 is the cross-section of a plate 33 secured directly onto the arm 5 and presents the greater thickness and the greater length ensuring good securing rigidity. The leg 31 which presents a smaller thickness is carried by the bar 28a in the form of tube part and protrudes over a small length in the direction of the axle 34 of the wheel. This leg 31 is, in fact, in the form of two tabs 35a and 35b.

The brake caliper 27 is constituted of two halves 27a and 27b assembled by screws 35 which cross through holes 36 provided in the tabs 35a and 35b. Each of the halves of the caliper 27 comprises a brake piston respectively 37a and 37b, movable in a bore and subjected during braking to a hydraulic pressure in order to return the brake linings 25a and 25b on contact with the friction paths of the disk 25. The tabs 35a and 35b are placed adjacent to the ends of the connecting piece 27, in such a manner as to leave, between them a central gap 38 (cf. FIGS. 2 and 3) which allows to introduce the brake linings 25a and 25b in service position as from the top, after removing the wheel 1. The brake linings maintained in position by gravity are, furthermore, confined by pins 39 which cross through the holes provided in the respective bosses 40 of the connecting piece 28 and of the half of the outer caliper 27a.

The median plane of the brake disk 25 is placed substantially in the median plane of the tabs 35a and 35b, and substantially symmetrical to the disk 26 with respect to the mean plane of the tire 7 of the wheel 1. The brake disk 26, which constitutes a second brake disk situated on the side opposite the center of the wheel 1, cooperates with a second disk brake caliper or yoke 41. In the embodiment represented on FIG. 1, the second brake caliper 41 which carries the brake linings 26a and 26b, is assembled and secured to an extension 42 of the connecting piece 28, situated on the side of the tab 35b. This extension 42 is displaced with respect to the plane of the support plate 35 in order to take into account the displaced plane of the disk 26 cooperating with the caliper 41 (cf. FIG. 3) and it presents two securing holes 43 intended to receive two bolts 44 for securing the caliper 41. The plate 33 presents the general form of a flattened sector or a triangle and, adjacent to each of the ends of this triangle, are provided threaded securing holes 46, 47, 48 in which are engaged the corresponding securing screws 49, 50, 51 that pass through the respective bosses 29, 30 provided on the single arm 5.

Various alternatives of the brake calipers and their attachment according to the invention are possible. According to one of these alternatives, the brake caliper 27 made of two parts constitutes, after assembly, a unit with the caliper or yoke 41, the halves of the double caliper being, for example in the form of a step in order to take into account the axial distance between the two disks. According to another attachment alternative, the intermediary or attaching piece 28 which was made in a strong single piece is also integral with the single arm 5, for example as a cast part. In this embodiment, the plate 33 can disappear or be integrated within the single arm 5, the only protruding parts of the attaching piece 28 thus being constituted by the bar 28a in the form of a tube part leading around the disks and the half 27a of the caliper 27, and by the tabs 35a and 35b.

The mounting and the operating method of the device for supporting the brake disk caliper or yoke according to the invention which was described hereinabove will now be explained in detail.

The attaching piece 28 is fitted with its two brake calipers 27 and 41 with their brake linings withdrawn to a maximum (in position of total release). The wheel 1 having been removed, the piece 28 is thus slid parallel to the friction paths of the disks, so that the free ends of the brake disks 25 and 26 arc introduced into the clamping slots of the corresponding calipers 27 and 41 with the brake linings on either side. The attaching piece 28 being positioned on the bosses 29, 30, it is sufficient, to perform mounting, to screw the screws 49, 50 and 51 into the corresponding threaded bores 46, 57, 48 of the plate 33. The braking equipment is completed by attaching the hydraulic braking conduits 54 and 55 to the front hydraulic master-cylinder. Successively actuating the master-cylinder moves the brake linings 25a, 25b, 26a, 26b closer to the corresponding friction paths and furthermore applies these linings onto the paths, the brake being ready to function. It is thus possible to remount the wheel 1 that envelopes the attaching piece 28 at a small distance from its periphery and the front gear/brake assembly is ready to operate with two brake disks.

During braking, the tangential stresses exerted by the disks on the brake calipers 27 and 41 are respectively carried forward onto the tabs 35a and 35b and on to the extension 42, where they are carried forward onto the bosses 29, 30 and onto the arm 5. The attaching piece 28 which presents an open form acts partially as a radiator for the brake calipers and protects them in service from excessive overheating liable to provoke dangerous boiling of the braking oil.

It is well understood that the present invention is in no way limited to the embodiments described and represented herein-above, but can be adapted to numerous alternatives available to those skilled in the art without departing from the scope and spirit of the invention.

I claim:

1. Device for supporting and attaching to non-rotating parts at least one brake caliper or yoke intended to cooperate with a brake disk, wherein said device comprises an attaching piece having a generally arcuate form, situated eyond the periphery of the disk and of which at least one part of the transverse section is U-shaped with two legs, one of which legs constitutes the section of a securing plate secured onto a member reacting to the braking torque, such as a single wheel suspension arm, while the other leg constitutes the section of at least one tab secured on either side to a brake caliper straddling a brake disk of which the mean plane substantially coincides with that of said at least one tab.

2. Device according to claim 1, wherein the two legs of the U-shape have unequal lengths, the longer arm being that corresponding to the transversal cross-section of the plate.

3. Device according to claim 1, wherein said device comprises two tabs located adjacent to the ends of the arc of the attaching piece and separated by a central gap allowing the introduction of the brake linings of the brake caliper or yoke.

4. Device according to claim 1, wherein the brake caliper is constituted by two parts assembled on the at least one tab and, where necessary, on themselves while surrounding the brake disk placed in the prolongation of the tabs.

5. Device according to claim 1, wherein the brake caliper is assembled on the at least one tab by means of screws passing through the assembly holes provided in said at least one tab.

6. Device according to claim 1, wherein the brake caliper or yoke comprises a fist part of the caliper straddling a first brake disk situated substantially in the extension of the at least one tab, and a second caliper part straddling a second brake disk, the active part of which is disposed facing the plate in a mean plane located between that of the plate and that of the at least one tab.

7. Device according to claim 1, wherein the attaching piece comprises a lateral extension of which the mean plane is displaced with respect to that of the securing plate, on the side opposite that of the at least one tab and which is provided with holes for securing another brake caliper cooperating with another brake disk disposed in the vicinity of the plate in a mean plane located between that of the plate and that of the at least one tab.

8. Device according to claim 1, wherein the securing plate on the member reacting to the braking torque has the general form of a flattened sector, with a general triangular shape, provided with securing holes adjacent to each of the ends of the triangle and having a greater thickness that of the tab.

* * * * *